United States Patent
May

[11] 3,869,847
[45] Mar. 11, 1975

[54] BAT CONSTRUCTION FOR A HARVESTER REEL

[75] Inventor: Donald L. May, Garfield, Wash.

[73] Assignee: J. E. Love Company, Garfield, Wash.

[22] Filed: Jan. 22, 1974

[21] Appl. No.: 435,530

[52] U.S. Cl. .................................................. 56/220
[51] Int. Cl. ............................................ A01d 57/02
[58] Field of Search ............................... 56/219–227

[56] References Cited
UNITED STATES PATENTS
3,232,035  2/1966  Vissers .............................. 56/219 X
3,796,030  3/1974  Neal et al. ............................ 56/220

*Primary Examiner*—Russell R. Kinsey
*Attorney, Agent, or Firm*—Graybeal, Barnard, Uhlir & Hughes

[57] ABSTRACT

A plurality of tubular bat blade sections are interconnected by journal sections having end pin portions which extend into the ends of the bat sections. Crank sections at the two ends of the bat include end pin portions which extend into the outer ends of the two outer bat blade sections. The bat blade sections are tapered from top to bottom, and each end of each bat blade section contains a tapered support brace which is permanently secured to the interior of the bat blade section and to the crank and journal end pin portions which project therein.

4 Claims, 5 Drawing Figures

PATENTED MAR 11 1975  3,869,847
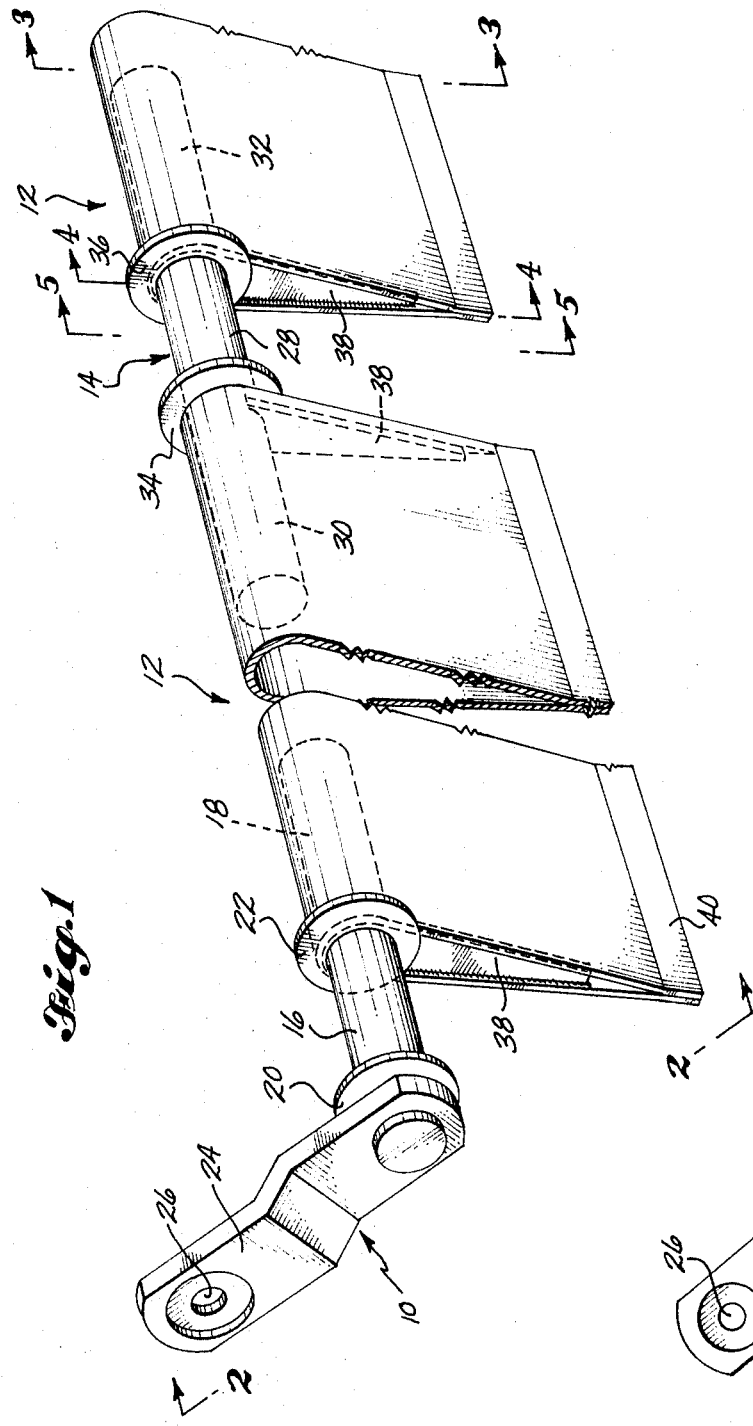
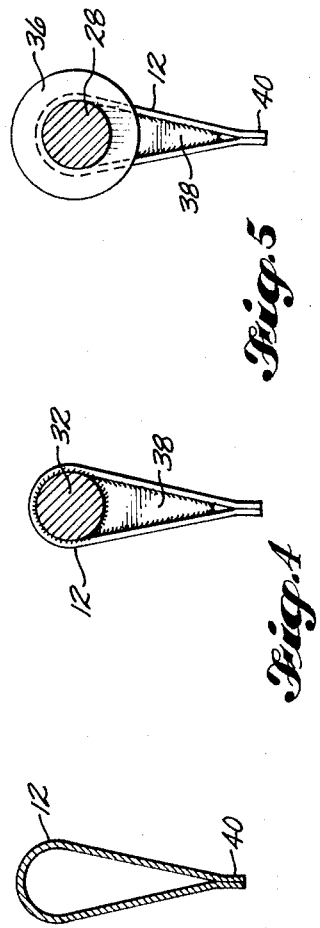
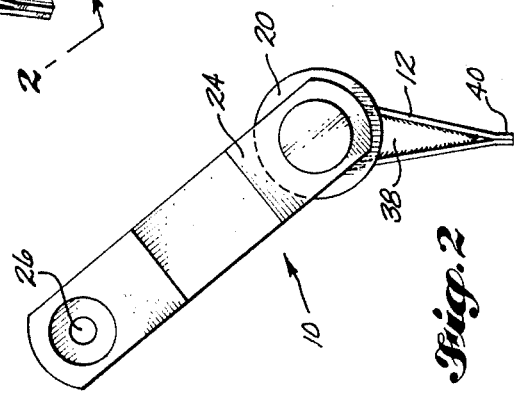

3,869,847

BAT CONSTRUCTION FOR A HARVESTER REEL

BACKGROUND OF THE INVENTION

1. Field of the Invention

The present invention relates to improvements in harvester pick-up reels, and in particular to an improved bat construction for such reels.

2. Description of the Prior Art

Known harvester reel bats are shown by U.S. Pat. No. 2,497,729; U.S. Pat. No. 3,145,520; U.S. Pat. No. 3,546,863; U.S. Pat. No. 3,561,198; and U.S. Pat. No. 3,585,815. The most widely used conventional bats comprise an elongated rod which extends the entire length of the harvester reel and a plurality of bat boards of rectangular configuration which are secured to the rod and depend therefrom. The rod is supported for rotation at its ends and at the locations between the bat boards. The bats are driven by an eccentric drive mechanism which operates to maintain the boards in a substantially verticle attitude during reel rotation. Examples of such eccentric drive mechanisms are disclosed by the aforementioned U.S. Pat. Nos. 2,497,729 and 3,145,520.

In U.S. Pat. No. 3,796,030, issued on Mar. 12, 1974, and assigned to by the Assignee of the present invention, a harvester reel bat construction is disclosed wherein the bats comprise a plurality of cast and tubular sections connected together end-to-end. The cast sections comprise a pair of crank sections which are at the two ends of the bat and which carry the outer journals of the bat. The remaining cast sections are intermediate journal sections serving also as connecting members for interconnecting the tubular bat blade sections. The bat blade sections taper from their upper to their lower edges. the intermediate journal sections which interconnect the tubular bat blade sections include end portions which are received by the bat blade sections. Projecting downwardly from these end portions within the bat blade sections are pin portions which are snugly slip fitted within the hollow bat blade sections and which may be secured therein by cross pins extending through the bat blade section and the projecting end portion. Additionally included on the journals are permanently mounted flanges which limit the extent of entry by the projecting end portions into the bat blade sections.

While such a bat construction is a considerable improvement over the aforementioned prior art, certain difficulties have limited the use thereof. These difficulties arise from the fact that the pin portions within the bat blade sections have a tendency to slip back and forth when torque is applied to the harvester reel bat. This slippage causes the skin surface of the bat blade sections to buckle and eventually fail as the harvester reel flexes.

SUMMARY OF THE INVENTION

According to the present invention, a plurality of tubular bat blade sections are interconnected by journal sections. Each journal section includes a central journal portion and end pin portions projecting therefrom into the opposite ends of the tubular bat blade sections. Crank sections, located at each end of the bat, have crank arm portions situated outwardly from journal portions with end pin portions extending therefrom into the outer ends of the outermost tubular bat blade sections. Located on each journal portion are end thrust members which may be freely movable washer-like members.

In order to obtain rigidity and torque strength in the bat, each end of each bat blade section contains therein a tapered support brace which is permanently secured to the end pin portion which projects into the bat blade section. The support brace depends endwise downwardly from the projecting end pin portion into the hollow bat blade section and is permanently mounted therewithin.

BRIEF DESCRIPTION OF THE DRAWINGS

FIG. 1 is a fragmentary elevational view looking towards one side of an end portion of the harvester reel bat of the present invention;

FIG. 2 is an end elevational view, on a reduced scale, of the crank section at such one end of the harvester reel bat;

FIG. 3 is a sectional view, on a reduced scale, taken substantially along line 3—3 of FIG. 1;

FIG. 4 is a sectional view, on a reduced scale, taken substantially along line 4—4 of FIG. 1; and FIG. 5 is a sectional view, on a reduced scale, taken substantially along line 5—5 of FIG. 1.

DESCRIPTION OF THE PREFERRED EMBODIMENT

Referring to FIGS. 1 and 2, the composite harvester reel bat of the present invention comprises a pair of crank end sections, one of which is shown and is designated 10, a plurality of bat blade sections 12, and a plurality of journal sections 14 which are located between and interconnect the bat blade sections 12. A second crank section (not shown) at the opposite end of the bat is like section 10 but oppositely directed. The number of blade and journal sections 12, 14 is variable and is dependent upon the length and style of the harvester reel.

The crank section 10 comprises a cylindrical journal portion 16 and an end pin portion 18 which projects from journal portion 16 into the tubular bat blade section 12. Two thrust washers 20, 22 are disposed about and freely movable along journal 16. Crank are 24 is provided at its uppermost end with a through opening 26 for receiving a connector used to connect such end of the crank arm 24 to a portion of an eccentric drive mechanism (not shown). Reference is made to the aforementioned U.S. patents for a disclosure of typical eccentric drives. When the bat is installed onto a harvester reel, the journal portion 16 is received within a suitable journal box forming member which is carried by the reel, movable thrust washers 20, 22 acting as boundaries for journal portion 16 when it is so received within a journal box.

The journal sections 14 comprise a central journal portion 28 and end pin portions 30, 32 which extend into the opposite ends of tubular bat sections 12. Thrust washers 34, 36 are disposed about and freely movable along the longitudinal surface of journal portion 28, thereby providing boundaries for journal portion 28 when journal section 14 is received within a suitable journal box forming member carried by the reel.

In order to securely fasten bat blade sections 12 to crank sections 10 and journal sections 14 and with reference to FIGS. 1, 3, 4 and 5, a support brace 38 is positioned and mounted within each end of each bat blade section 12. In preferred form, the plane of brace 38 is essentially perpendicular to the longitudinal axis of crank and journal sections 10, 14. The shape of brace 38 conforms to the shape of bat blade section 12, bat sections 12 and braces 38 preferably being tapered in an essentially V-shaped configuration. Both sides of each brace 38 are in contact with and permanently secured to the appropriate interior sides of the bat blade 12, such as by welding. The top surface of brace 38 is rounded to conform to the shape of the projecting end pin portion positioned within the bat blade section and is secured thereto, preferably by welding. In preferred form, then, there is a continuous weld on all surfaces of the support braces 38 so as to securely hold and maintain bat blade sections 12 in proper alignment with crank sections 10 and journal sections 14. In this manner, the support braces cannot move or slip within the bat blade sections when the reel is torqued, such torquing of the reel occurring frequently during use thereof. Therefore, the skin surfaces of the bat blade sections do not buckle and fail as in the previous aforementioned harvester reel design.

When the bat is on a harvester reel, suitable journal boxes carried by the reel surroundingly engage the journal portions 16, 28. Preferably, the crank and journal sections 10, 14 are made by casting them from a suitable metal. The bat blade sections 12 may be formed from bent sheet metal which is seam welded along the lower edges 40 of the sections 12, where the two parts of the sheet metal panels forming the sections 12 come together (FIG. 3). Alternatively, the hollow bat blade sections 12 may be formed by an extrusion process. The tapered support braces 38 may be made from any suitable metal and are preferably constructed by form cutting them from a suitable sheet metal.

During use the pick-up reel rotates forwardly at its top and rearwardly at its bottom. Each bat normally carries a plurality of tines (not shown) which enter into the fallen crop and in effect "comb" the crop upwardly and rearwardly to a cutter mechanism which severs the crop near the ground. The tines and bats then sweep the severed crop rearwardly into a collection portion of the harvester. An advantageous feature of the bat construction of this invention as well as the construction disclosed in U.S. Pat. No. 3,796,030 is that the bat has a thin lower edge which enters into the crop better than a relatively thick blunted edge. As a result, each bat makes less lay-over contact with the crop than conventional bats resulting in less crop loss. Reference is made to the aforementioned U.S. Pat. No. 3,796,030 for a disclosure of a preferred tine construction and attachment of such tines to the illustrated bat blade construction.

It will be understood that the invention is not to be limited to the details given herein but that it may be modified within the scope of the appended claims.

What is claimed is:

1. A harvester reel bat comprising:
a plurality of tubular bat blade sections, a plurality of journal sections disposed between and interconnecting said bat blade sections, and crank sections disposed at each end of said bat, said crank and journal sections having journal portions thereon, and each said crank section having a crank arm portion situated endwise outwardly of its journal portion with said journal portion having end thrust members engaged therearound and an inner end pin portion projecting into the adjacent outer bat blade section, and each said journal section having a central journal portion with end thrust members engaged therearound, and end pin portions projecting into the opposite ends of the adjacent tubular bat blade sections to interconnect said adjacent bat blade sections, there being a relatively thin support brace plate located within each outermost end of each bat section depending endwise downwardly from the projecting end pin portion into the hollow bat blade section, said support brace plate being permanently mounted along its edges to the projecting end pin portion and the interior sides of the hollow bat blade section to prevent said brace plate from moving relative to said bat blade section when said harvester reel bat is torqued.

2. A harvester reel bat according to claim 1, wherein said end thrust members are freely movable along the journal portions of said crank and journal sections, and wherein the support brace plates and the tubular bat blade sections taper as they extend downwardly from their upper to their lower edges.

3. A harvester reel bat according to claim 2, wherein the planes of said tapered support brace plates are essentially perpendicular to the longitudinal axis of said journal portions.

4. A harvester reel bat according to claim 3, wherein the relatively thin tapered support brace plates are formed from sheet metal, and the bat blade sections are formed from formed panels of sheet metal having lower edge portions which come together and which are secured together along the lower edge of the bat blade sections, said support brace plates being welded along their edges to the bat blade sections and the projecting end pin portions.

* * * * *